(12) United States Patent
Sato (10) Patent No.: US 8,385,422 B2
(45) Date of Patent: Feb. 26, 2013

(54) IMAGE PROCESSING APPARATUS AND IMAGE PROCESSING METHOD

(75) Inventor: Ko Sato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 899 days.

(21) Appl. No.: 12/372,537

(22) Filed: Feb. 17, 2009

(65) Prior Publication Data

US 2010/0027664 A1 Feb. 4, 2010

(30) Foreign Application Priority Data

Aug. 4, 2008 (JP) ................................. 2008-201138

(51) Int. Cl.
*H04N 7/12* (2006.01)
(52) U.S. Cl. ......... 375/240.16; 375/240.12; 375/240.01; 375/240
(58) Field of Classification Search .................. None
See application file for complete search history.

(56) References Cited

U.S. PATENT DOCUMENTS

| 5,926,573 | A | * | 7/1999 | Kim et al. ..................... 382/239 |
| 5,940,141 | A | * | 8/1999 | Faroudja et al. ............... 348/628 |
| 5,963,259 | A | * | 10/1999 | Nakaya et al. ............ 375/240.17 |
| 6,192,079 | B1 | * | 2/2001 | Sharma et al. ........... 375/240.16 |
| 6,229,570 | B1 | * | 5/2001 | Bugwadia et al. ............. 348/441 |
| 7,375,760 | B2 | * | 5/2008 | Kempf et al. .................. 348/441 |
| 2006/0050785 | A1 | * | 3/2006 | Watanabe et al. ........ 375/240.03 |
| 2006/0067403 | A1 | * | 3/2006 | Sakai ...................... 375/240.12 |
| 2007/0269137 | A1 | * | 11/2007 | Ida et al. ....................... 382/299 |
| 2007/0273787 | A1 | * | 11/2007 | Ogino et al. .................. 348/441 |
| 2008/0030450 | A1 | * | 2/2008 | Yamagishi et al. ............. 345/89 |
| 2008/0137747 | A1 | | 6/2008 | Yamasaki et al. |
| 2011/0164258 | A1 | * | 7/2011 | Nakamura ..................... 358/1.2 |

FOREIGN PATENT DOCUMENTS

| JP | 07-030859 | | 1/1995 |
| JP | 2003-069961 | * | 3/2003 |
| JP | 2005-017725 | * | 1/2005 |
| JP | 2006-020050 | | 1/2006 |
| JP | 2007-082030 | | 3/2007 |
| JP | 2007-310837 | | 11/2007 |
| JP | 2007-336239 | | 12/2007 |
| JP | 2007318193 | | 12/2007 |
| JP | 2008-131244 | | 6/2008 |
| JP | 2008-147951 | | 6/2008 |

OTHER PUBLICATIONS

Japanese Patent Application No. 2008-201138, Partial English Translation of Office Action, mailed Jun. 30, 2009.
Japanese Patent Application No. 2008-201138, Decision of Rejection, mailed Sep. 29, 2009, (with English Translation).

* cited by examiner

*Primary Examiner* — Oscar Louie
*Assistant Examiner* — Lisa Lewis
(74) *Attorney, Agent, or Firm* — Blakley, Sokoloff, Taylor & Zafman LLP

(57) ABSTRACT

According to one embodiment, an image processing apparatus includes a resolution increasing module and a moving-image improving module. The resolution increasing module that performs, on receipt of a first video signal with first resolution, super resolution conversion on the first video signal to obtain a second video signal with second resolution that is higher than the first resolution by estimating an original pixel value from the first video signal and increasing the pixels. The moving-image improving module that increases the frame rate of the second video signal after the super resolution conversion.

7 Claims, 8 Drawing Sheets

IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2008-201138, filed Aug. 4, 2008, the entire contents of which are incorporated herein by reference.

BACKGROUND

1. Field

One embodiment of the invention relates to a technology for increasing resolution of an image.

2. Description of the Related Art

Frame rate conversion is a technology for increasing a frame rate representing the number of frames of an input video signal per second to thereby display a smooth image of a moving object. A conventional technology of such frame rate conversion is disclosed in, for example, Japanese Patent Application Publication (KOKAI) No. 2007-82030. According to the conventional technology, motion compensation is performed on each of a plurality of image data sets that constitute video data to calculate a motion vector between two frames adjacent in time. An interpolation frame is generated based on the motion vector to be interpolated between the two frames.

Meanwhile, with the widespread of high-resolution televisions and displays, the resolution of image data becomes higher. As the resolution of an image signal increases, the data volume involved in image processing on the image signal increases. Therefore, there is a need for a technology capable of more efficient image processing. Accordingly, there has been proposed the technology of image processing referred to as super resolution processing (super-resolution enhancement). In the super resolution processing, an original pixel value is estimated from a low-resolution image signal, and the pixels are increased to obtain a high-resolution image signal. Thus, the super resolution processing increases the resolution of an image signal while maintaining the sharpness thereof. Reference may be had to, for example, Japanese Patent Application Publication (KOKAI) Nos. 2007-336239 and 2007-310837.

To display more sharp and smooth image, an input image signal needs not only to be interpolated with interpolation frames to change the frame rate but also to be subjected to the super-resolution enhancement.

Suppose that the super resolution processing is performed after the frame rate conversion of a video signal. With the conventional technology of frame rate conversion, a motion compensation error may occur due to erroneous estimation of a motion vector in motion compensation for generating an interpolation frame. If the super resolution processing is performed on image data having a motion compensation error, the motion compensation error is emphasized due to the super resolution processing. As a result, the super resolution processing has an adverse effect on an image displayed on a television or a display and degrades the image quality.

Beside, interpolation frames generated and interpolated between frames of input image data increase the original number of the frames of the image data. If the super resolution processing is performed after the interpolation frames are interpolated between the frames, the super resolution processing is required to be performed on the interpolation frames as well as the frames of the image data. This increases the amount of the super resolution processing.

If the super resolution processing is performed on the frames of moving image data except for interpolation frames, it means that the super resolution processing is not performed on all the frames of the moving image data. Thus, this reduces the effect of improving the sharpness of the moving image.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an image processing apparatus comprises a resolution increasing module and a moving-image improving module. The resolution increasing module is configured to perform, on receipt of a first video signal with first resolution, super resolution conversion on the first video signal to obtain a second video signal with second resolution that is higher than the first resolution by estimating an original pixel value from the first video signal and increasing the pixels. The moving-image improving module is configured to increase the frame rate of the second video signal after the super resolution conversion.

According to another embodiment of the invention, an image processing apparatus comprises a resolution increasing module and a moving-image improving module. The resolution increasing module is configured to perform super resolution conversion on a first video signal with first resolution to obtain a second video signal with second resolution that is higher than the first resolution. The moving-image improving module is configured to increase the frame rate of the second video signal obtained by the super resolution conversion.

According to still another embodiment of the invention, an image processing method comprises: performing, on receipt of a first video signal with first resolution, super resolution conversion on the first video signal to obtain a second video signal with second resolution that is higher than the first resolution by estimating an original pixel value from the first video signal and increasing the pixels; and increasing the frame rate of the second video signal after the super resolution conversion.

Figure 1:
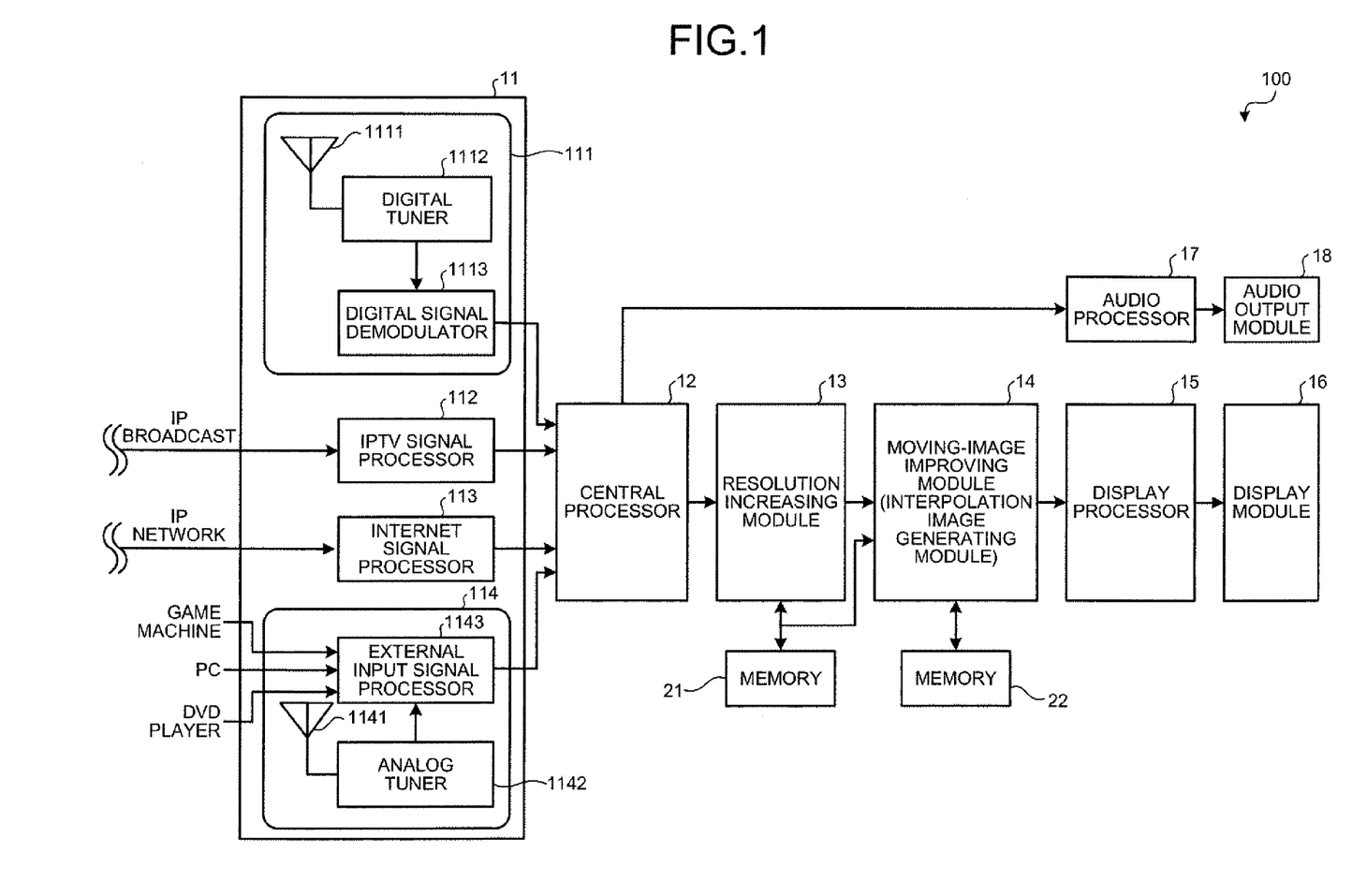
FIG. 1 is an exemplary schematic block diagram of an image display apparatus according to an embodiment of the invention.

FIG. 1 is a schematic block diagram of an image display apparatus 100 according to an embodiment of the invention. As illustrated in FIG. 1, the image display apparatus 100 comprises a video signal input module 11, a central processor 12, a resolution increasing module 13, a moving-image improving module 14, a display processor 15, a display module 16, an audio processor 17, an audio output module 18, and memories (SDRAMs) 21 and 22. The resolution increasing module 13 corresponds to an image processing apparatus.

The video signal input module 11 comprises a digital broadcast receiver 111, an Internet protocol television (IPTV) signal processor 112, an Internet signal processor 113, and an external input module 114. The digital broadcast receiver 111 receives an video signal to be displayed. The Internet signal processor 113 receives data transmitted through an IP network such as the Internet. The external input module 114 receives input of an analog signal. The term "video signal" as used herein includes audio signals as well as image signals such as still image signals and moving image signals.

The digital broadcast receiver 111 comprises a digital antenna 1111, a digital tuner 1112, and a digital signal demodulator 1113. The digital antenna 1111 receives digital broadcasting such as BS broadcasting, CS broadcasting, and digital terrestrial broadcasting. The digital tuner 1112 is used to select a digital broadcast channel. The digital signal demodulator 1113 demodulates a digital broadcast signal, and outputs it to the central processor 12 as a digital video signal.

The IPTV signal processor 112 receives IP broadcasting transmitted over a dedicated IP network, and outputs it to the central processor 12 as a digital video signal.

The Internet signal processor 113 receives data (still image, moving image, etc.) transmitted through an IP network such as the Internet, and outputs it to the central processor 12 as a digital video signal.

The external input module 114 comprises an analog antenna 1141, an analog tuner 1142, and an external input signal processor 1143. The analog antenna 1141 receives analog broadcasting. The analog tuner 1142 is used to select an analog broadcast channel. The external input signal processor 1143 performs signal processing, such as A/D conversion, on an analog signal, and outputs it to the central processor 12 as a digital video signal. The external input signal processor 1143 is provided with a terminal (not shown) for connection to an external device such as a game machine, a personal computer (PC), a digital versatile disk (DVD) player. The external input signal processor 1143 performs the signal processing also on an analog signal received from an external device through the terminal.

The central processor 12 separates a video signal received by the video signal input module 11 into image data and audio data. After performing predetermined signal processing on the image data, the central processor 12 outputs the image data to the resolution increasing module 13 as well as outputting the audio data to the audio processor 17.

Examples of the signal processing performed by the central processor 12 include format conversion for converting the format of image data to a predetermined format (e.g., MPEG) and MPEG decoding. It is assumed herein that the central processor 12 outputs moving image data of a low-resolution 720×480 (720 horizontal pixels and 480 vertical lines) standard definition (SD) image frame by frame to the resolution increasing module 13. However, this is by way of example only as low-resolution image data of other sizes are also possible. More specifically, moving image data of any images having a lower resolution than the high definition (HD) resolution of 1920×1080 pixels may be output from the central processor 12 to the resolution increasing module 13.

Figure 3:
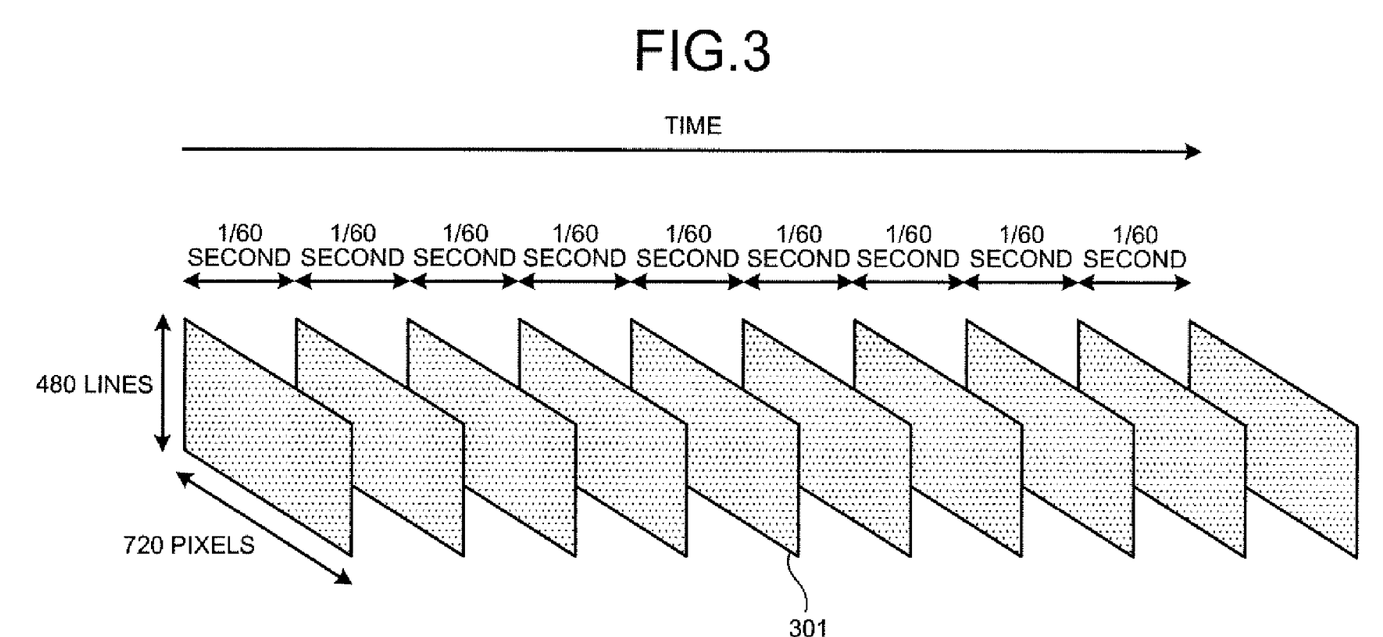
FIG. 3 is an exemplary schematic diagram of a plurality of low-resolution frames that constitute moving image data to be output to the resolution increasing module in the embodiment.

FIG. 3 is a schematic diagram of a plurality of low-resolution frames that constitute moving image data to be output to the resolution increasing module 13 according to the embodiment. As illustrated in FIG. 3, low-resolution frames 301 each have an image size of 720×480 pixels. Moving image data consisting of a plurality of the low-resolution frames 301 has a frame rate of 60 frames per second (fps), and 60 low-resolution frames thereof are displayed per second.

Referring back to FIG. 1, the resolution increasing module 13 receives the moving image data of the low-resolution image output from the central processor 12 frame by frame. The resolution increasing module 13 performs super resolution conversion, which will be described later, on the moving image data to generate high-resolution HD moving image data.

Figure 2:
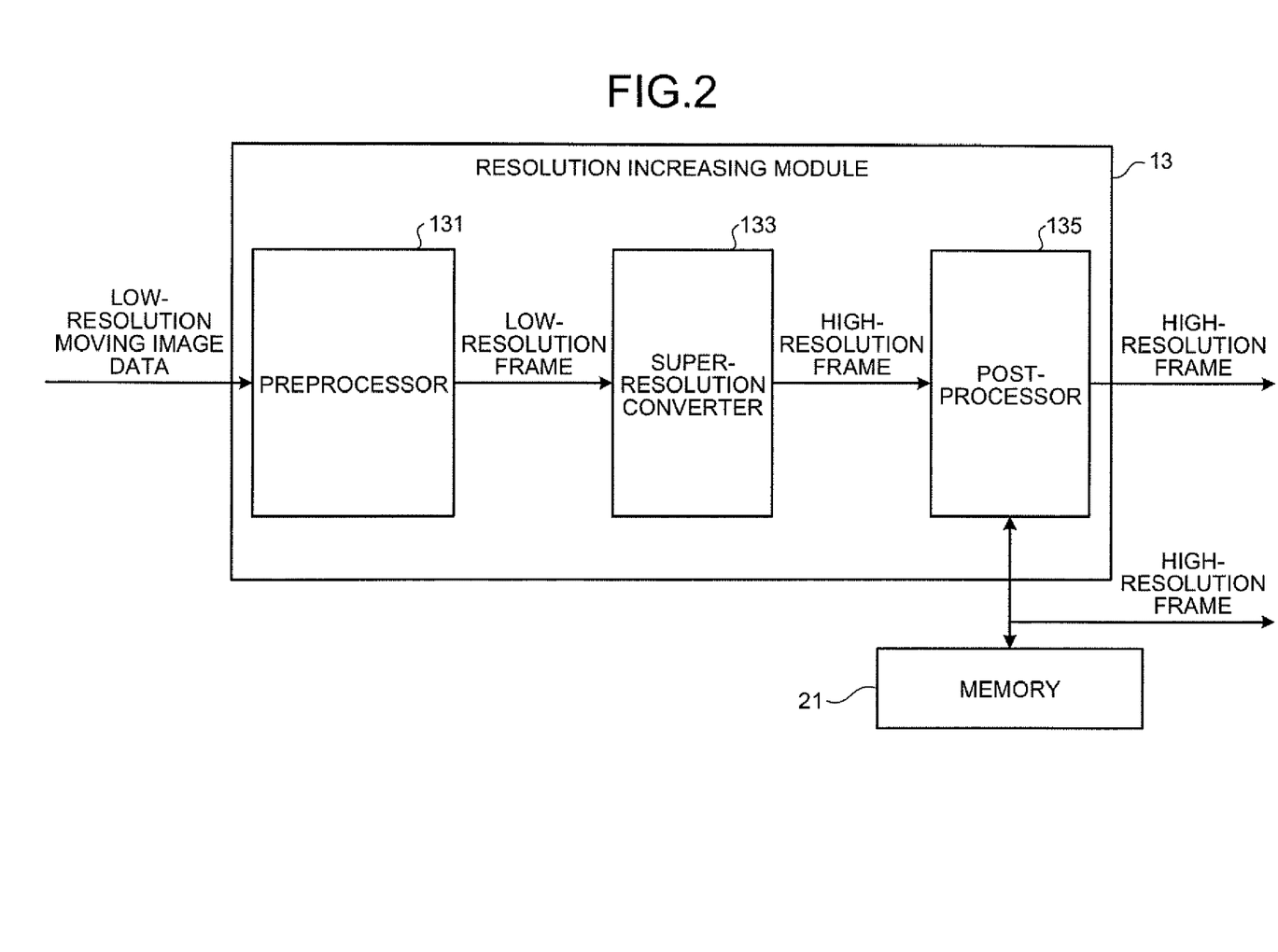
FIG. 2 is an exemplary block diagram of a resolution increasing module in the embodiment.

FIG. 2 is a block diagram of the resolution increasing module 13. As illustrated in FIG. 2, the resolution increasing module 13 comprises a preprocessor 131, a super-resolution converter 133, and a post-processor 135.

The preprocessor 131 performs preprocessing on the frames of the moving image data of the low-resolution image (hereinafter, "low-resolution frame") received from the central processor 12, and then outputs them to the super-resolution converter 133. Examples of the preprocessing include interlace/progressive (IP) conversion and noise reduction (NR) processing to remove noise from an image signal.

More specifically, as the IP conversion, the preprocessor 131 detects motion of an image in the low-resolution frames and determines whether the image data represents a still image or a moving image. When the image data represents a still image, the preprocessor 131 performs still image interpolation. On the other hand, when the image data represents a moving image, the preprocessor 131 performs moving image interpolation.

As the NR processing, the preprocessor 131 corrects the contour of the image data, reduces image blur and glare, suppresses excessive equalizing (high-frequency enhancement), and corrects camera shake blur caused by the horizontal movement of a camera.

The super-resolution converter 133 performs image processing or resolution enhancement (hereinafter, "super resolution conversion") on a low-resolution frame received from the preprocessor 131 to increase the resolution, thereby generating a frame of high-resolution moving image data in HD size (hereinafter, "high-resolution frame"). The super-resolution converter 133 outputs the high-resolution frame to the post-processor 135.

The term "super resolution conversion" as used herein refers to image sharpening, in which, from an image signal with low resolution, i.e., first resolution (a low-resolution frame), an original pixel value is estimated to increase the pixels and thus to restore an image signal with high resolution, i.e., second resolution (a high-resolution frame).

The term "original pixel value" as used herein refers to the value of each pixel of an image signal obtained by, for example, photographing the same object as that of an image with low resolution (first resolution) with a camera having high-resolution pixels and capable of capturing an image with high resolution (second resolution).

Besides, "original pixel value is estimated to increase the pixels" means to obtain the characteristics of images to find a correlated image, and estimate an original pixel value from neighboring images (in the same frame or between frames) using the correlated image to increase the pixels.

The super resolution conversion may be performed using known or commonly used technologies as disclosed in, for example, Japanese Patent Application Publication (KOKAI) Nos. 2007-310837, 2008-98803, and 2000-188680. In the embodiment, the super resolution conversion uses a technology of, for example, restoring an image with frequency components above the Nyquist frequency determined by the sampling rate of an input image.

If employing the super resolution conversion disclosed in Japanese Patent Application Publication (KOKAI) No. 2007-310837, the super-resolution converter 133 sets a target pixel in each of a plurality of low-resolution frames, and sets a target image area so that it contains the target pixel. The super-resolution converter 133 selects a plurality of correspondent points that correspond to a plurality of target image areas closest to a variation pattern of the pixel value in the target image area from a reference frame. The super-resolution converter 133 sets a sample value of luminance of a correspondent point to the pixel value of a corresponding target pixel. The super-resolution converter 133 calculates a pixel value for a high-resolution frame having more pixels than the reference frame and corresponding to the reference frame based on the size of a plurality of sample values and layout of the correspondent points. Thus, the super-resolution converter 133 estimates an original pixel value from a low-resolution frame, and increases the pixels to restore a high-resolution frame.

If employing the super resolution conversion using self-congruency position search in the same frame image disclosed in Japanese Patent Application Publication (KOKAI) No. 2008-98803, the super-resolution converter 133 calculates a first pixel position with the smallest error, i.e., a first error, by comparing errors of respective pixels in a search area of a low-resolution frame. The super-resolution converter 133 calculates a position with the smallest error in the search area with decimal precision based on the first pixel position and the first error, and a second pixel position around a first pixel and a second error thereof. The super-resolution converter 133 calculates a decimal-precision vector that has its end point at the position with the smallest error and its start point at a pixel of interest. The super-resolution converter 133 calculates an extrapolation vector of the decimal-precision vector that has its end point at a pixel on a screen which is not in the search area based on the decimal-precision vector. The super-resolution converter 133 calculates a pixel value for a high-resolution image having more pixels than image data based on a pixel value obtained from the image data, the decimal-precision vector, and the extrapolation vector. In this manner, the super-resolution converter 133 estimates an original pixel value from a low-resolution frame, and increases the pixels to restore a high-resolution frame.

The super-resolution converter 133 may employ the super resolution conversion disclosed in Japanese Patent Application Publication (KOKAI) No. 2000-188680 using mapping between a plurality of frames.

The above technologies of the super resolution conversion are cited by way of example and not by way of limitation. The super-resolution converter 133 may employ various other technologies in which an original pixel value is estimated from a low-resolution image signal to increase the pixels to thereby obtain a high-resolution image signal.

The post-processor 135 performs image correction such as gamma correction, contrast enhancement, gray-scale or tone correction, and color management on high-resolution frames generated by the super-resolution converter 133. After the image correction, the post-processor 135 sequentially outputs the high-resolution frames to the moving-image improving module 14 arranged at the latter stage as well as sequentially storing them in the memory 21, which may be a synchronous dynamic random access memory (SDRAM). Incidentally, the image correction may not necessarily be performed.

Figure 4:
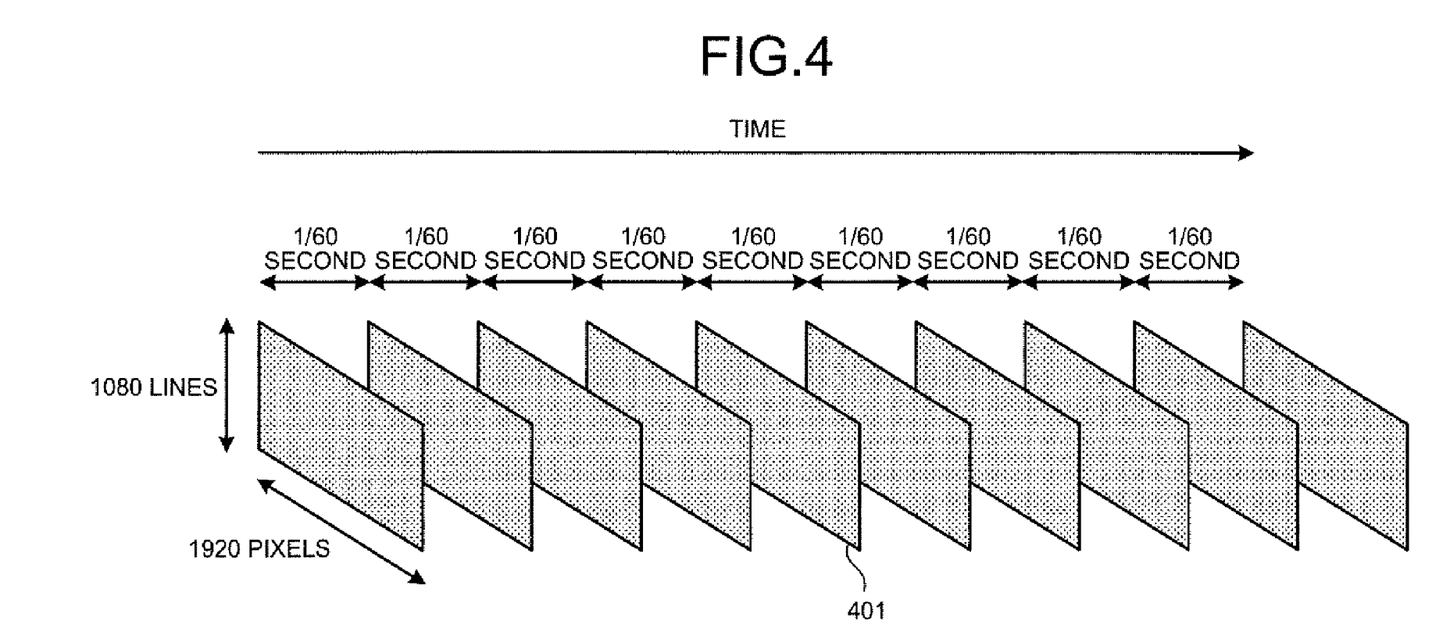
FIG. 4 is an exemplary schematic diagram of a plurality of high-resolution frames generated by the resolution increasing module in the embodiment.

FIG. 4 is a schematic diagram of a plurality of high-resolution frames generated by the resolution increasing module 13 according to the embodiment. As illustrated in FIG. 4, high-resolution frames 401 each have an image size of 1920× 1008 pixels. Moving image data consisting of a plurality of the high-resolution frames 401 has a frame rate of 60 fps, and 60 high-resolution frames thereof are displayed per second.

Referring back to FIG. 1, the moving-image improving module 14 generates an interpolation frame from image data consisting of a plurality of high-resolution frames received from the resolution increasing module 13 to increase the frame rate of the image data. In the embodiment, to change the frame rate, the moving-image improving module 14 performs motion compensation based on two high-resolution frames and generates an interpolation frame.

More specifically, the moving-image improving module 14 receives a high-resolution frame subjected to the super resolution conversion output from the resolution increasing module 13. Meanwhile, the moving-image improving module 14 reads an immediately preceding frame, i.e., a high-resolution frame subjected to the super resolution conversion one frame prior to the high-resolution frame received from the resolution increasing module 13, out of the memory 21. The moving-image improving module 14 calculates a motion vector from the two high-resolution frames to perform motion compensation, and, based on the result, obtains an interpolation frame to be interpolated between the two high-resolution frames.

Such interpolation frame generation may be performed using known or commonly used technologies as disclosed in, for example, Japanese Patent Application Publication (KOKAI) No. 2008-35404. This technology of interpolation frame generation is cited by way of example and not by way of limitation. The moving-image improving module 14 may employ various other technologies in which an interpolation frame is generated by motion compensation performed based on a plurality of frames.

In the embodiment, the moving-image improving module 14 converts the frame rate of moving image data subjected to the super resolution conversion by the resolution increasing module 13 from 60 fps to 120 fps so that 120 frames are displayed per second by interpolating an interpolation frame between each pair of the frames.

Figure 5:
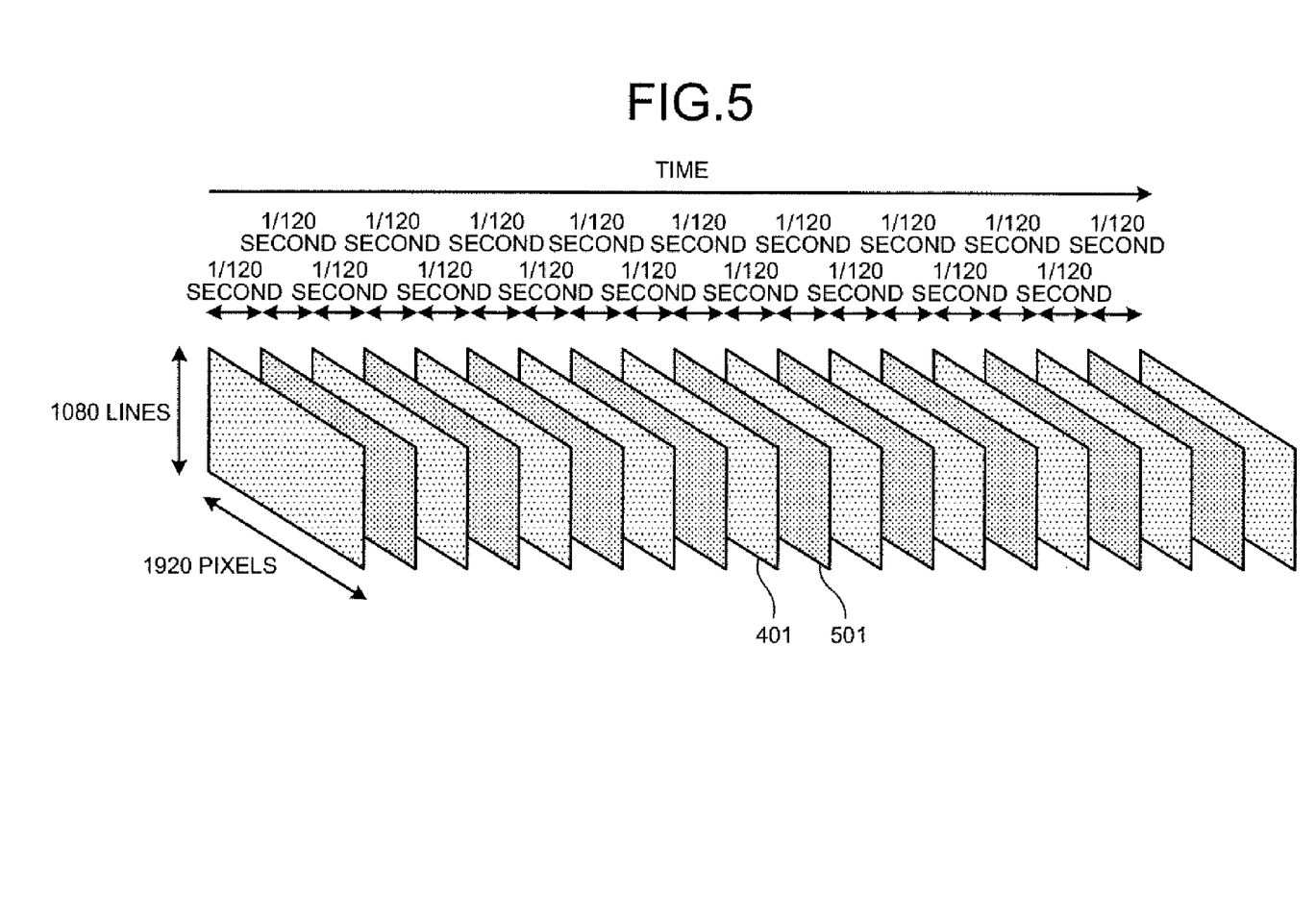
FIG. 5 is an exemplary schematic diagram of a plurality of high-resolution frames that constitute moving image data after frame rate conversion by a moving-image improving module in the embodiment.

FIG. 5 is a schematic diagram of a plurality of high-resolution frames that constitute moving image data subjected to frame rate conversion by the moving-image improving module 14. As illustrated in FIG. 5, an interpolation frame 501 is interpolated between each pair of the high-resolution frames 401. This reduces the time interval between the frames to $\frac{1}{120}$ second and thus increases the frame rate to 120 fps.

The frame rate converted by the moving-image improving module 14 is cited above by way of example and not limitation. In addition, although an example is described in which one interpolation frame is interpolated between each pair of the high-resolution frames 401, a plurality of interpolation frames may be interpolated between each pair of the high-resolution frames 401.

As described above, according to the embodiment, interpolation frames are interpolated in moving image data consisting of low-resolution frames not before the super resolution conversion but after it. That is, after the super resolution conversion is performed on low-resolution frames to obtain high-resolution frames, interpolation frames are interpolated between the high-resolution frames to change the frame rate. As a result, the number of frames which need the super resolution conversion reduces, resulting in less processing amount. Moreover, there is no chance that the super resolution conversion is performed on a frame having a motion compensation error that has occurred during interpolation frame generation. Thus, moving image data of high image quality can be obtained.

Generally, in interpolation frame generation based on motion compensation, it is difficult to completely prevent distortion or failure that is not present in an original image or the motion from occurring in an interpolation frame due to the erroneous detection of a motion vector. Besides, if a technology based on block matching is employed for interpolation frame generation based on motion compensation, it is often the case that the distortion of an interpolation frame due to the erroneous detection of a motion vector appears as block artifacts. Such block artifacts are particularly pronounced at the boundary between a moving object and a still object and in an image area containing a loop pattern. In the general super resolution conversion, image sharpening is performed to emphasize the contour of an object.

Consider the case that the super resolution conversion is performed on frames that constitute moving image data that has been interpolated with interpolation frames if a motion vector is erroneously detected in an area during interpolation frame generation and thus an interpolation frame with block artifacts or distortion is input in the super-resolution converter 133, the block artifacts are not distinguished from the boundary between images or the contour of an object in ordinary video. Accordingly, the block artifacts are emphasized and thus degrades image quality of moving image data to be output.

In addition, if the super resolution conversion is performed after interpolation frame generation, the super resolution conversion needs to be performed at a frame rate twice as high as the frame rate of input moving image data. This doubles the amount of the super resolution processing. If a plurality of interpolation frame are generated and interpolated between two frames, the amount of the super resolution processing further increases.

Besides, if the super resolution processing is performed on the frames of moving image data except for interpolation frames, it means that the super resolution processing is not performed on all the frames of the moving image data. This reduces the effect of improving the sharpness of the image.

As described above, according to the embodiment, the super resolution conversion is previously performed on low-resolution frames to obtain moving image data of high-resolution frames. Then, interpolation frames are generated and interpolated between the high-resolution frames. Thus, it is possible to reduce the amount of the super resolution processing as well as to improve the sharpness of the image by the super resolution processing. Further, such an adverse effect can be prevented that frame interpolation emphasizes the distortion of the image.

The display processor 15 comprises a display driver and controls display of moving image data received from the moving-image improving module 14 on the display module 16. The display module 16 comprises a display device such as a liquid crystal display (LCD) panel or a surface-conduction electron-emitter display (SED) panel. The display module 16 displays an image according to an image signal on the screen under the control of the display processor 15.

The audio processor 17 converts a digital audio signal received from the central processor 12 into an analog audio signal in a format reproducible by the audio output module 18. The audio processor 17 then outputs the analog audio signal to the audio output module 18. The audio output module 18 may be a speaker or the like. On receipt of the analog audio signal from the audio processor 17, the audio output module 18 outputs it as audio.

Figure 6:
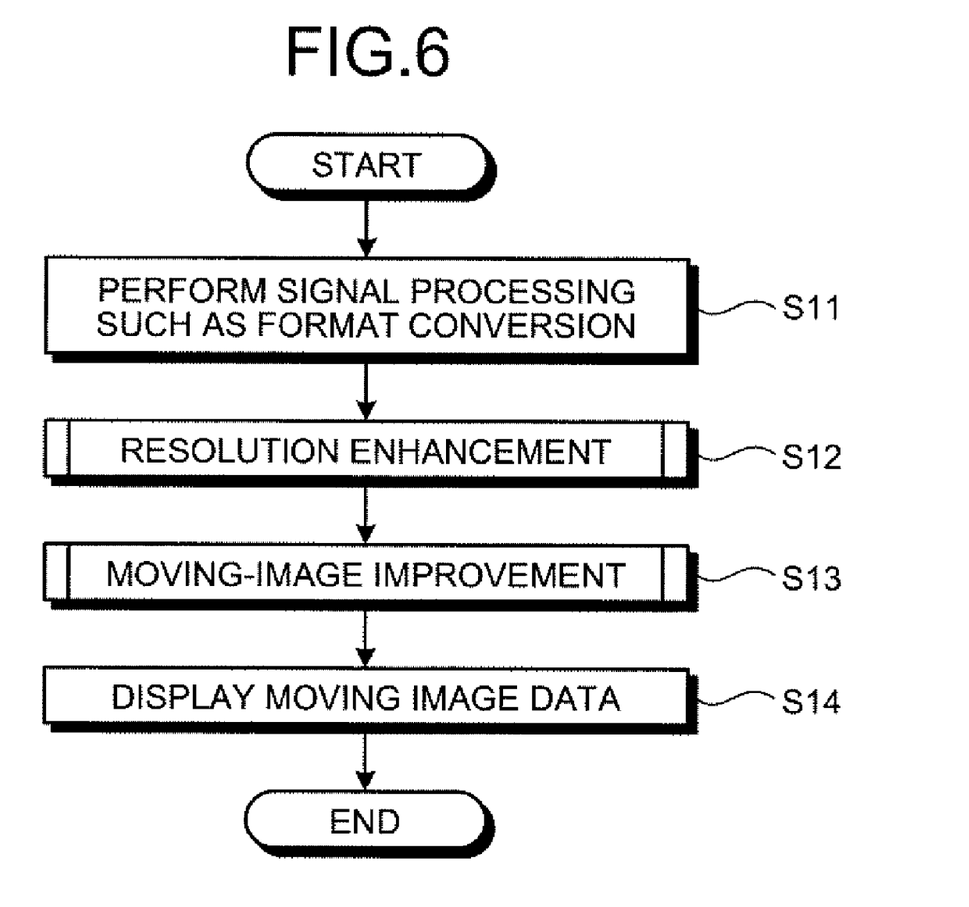
FIG. 6 is an exemplary flowchart of a process of displaying moving image data in the embodiment.

A description will be given of resolution enhancement and moving-image improvement performed on moving image data as described above. FIG. 6 is a flowchart of a process of displaying the moving image data according to the embodiment.

Predetermined processing such as digital demodulation is performed on a video signal of digital broadcasting, etc. received by the digital broadcast receiver 111 or the like. The video signal is then input to the central processor 12. Incidentally, other signals than those of digital broadcasting are also input to the central processor 12.

On receipt of the video signal, the central processor 12 performs signal processing such as format conversion and decoding on the video signal, and separates the video signal into image data and audio data (S11). Among the image data subjected to the signal processing, moving image data is input to the resolution increasing module 13. Low-resolution frames constitute the moving image data. On receipt of the moving image data consisting of the low-resolution frames, the resolution increasing module 13 performs resolution enhancement to convert the low-resolution frames to high-resolution frames (S12).

Figure 7:
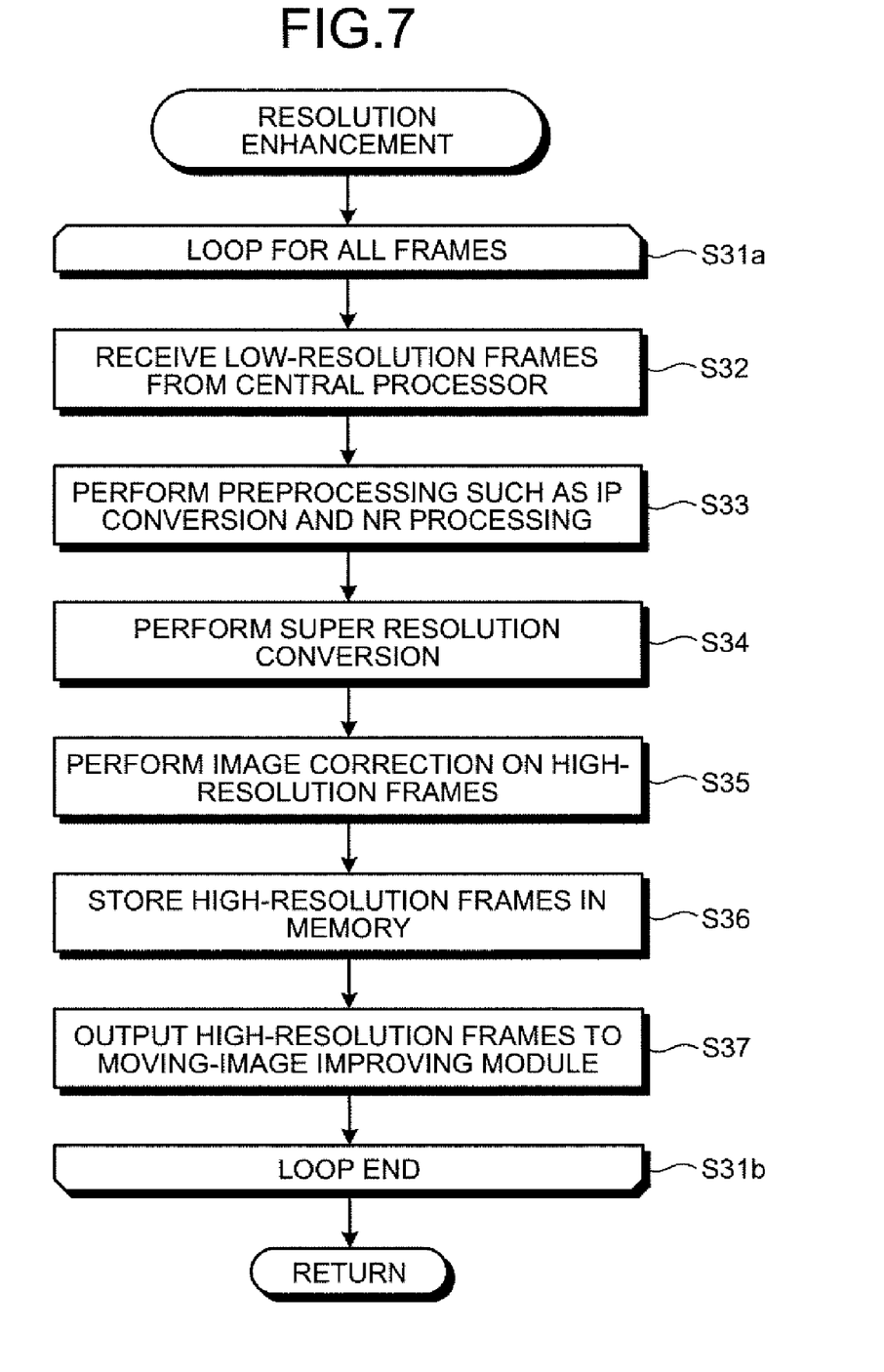
FIG. 7 is an exemplary flowchart of resolution enhancement in the embodiment.

FIG. 7 is a flowchart of the resolution enhancement performed at S12 in FIG. 6. The preprocessor 131 receives the low-resolution frames constituting the moving image data sequentially output from the central processor (S32). The preprocessor 131 then performs preprocessing, such as the IP conversion and the NR processing to remove noise from the image signal, on the low-resolution frames (S33).

Thereafter, the super-resolution converter 133 performs the super resolution conversion on the low-resolution frames subjected to the preprocessing to sharpen the image (S34). The post-processor 135 performs image correction such as gamma correction on high-resolution frames obtained by performing the super resolution conversion on the low-resolution frames (S35).

The post-processor 135 stores the high-resolution frames subjected to the image correction in the memory 21 (S36), and also sequentially outputs them to the moving-image improving module 14 (S37). The process from S32 to S37 is performed for all low-resolution frames of input moving image data (S31a and S31b).

Referring back to FIG. 6, after the super resolution conversion, the moving-image improving module 14 performs moving-image improvement on the moving image data consisting of the high-resolution frames. More specifically, the moving-image improving module 14 generates interpolation frames and interpolates them between the high-resolution frames, thereby changing the frame rate of the moving image data (S13).

Figure 8:
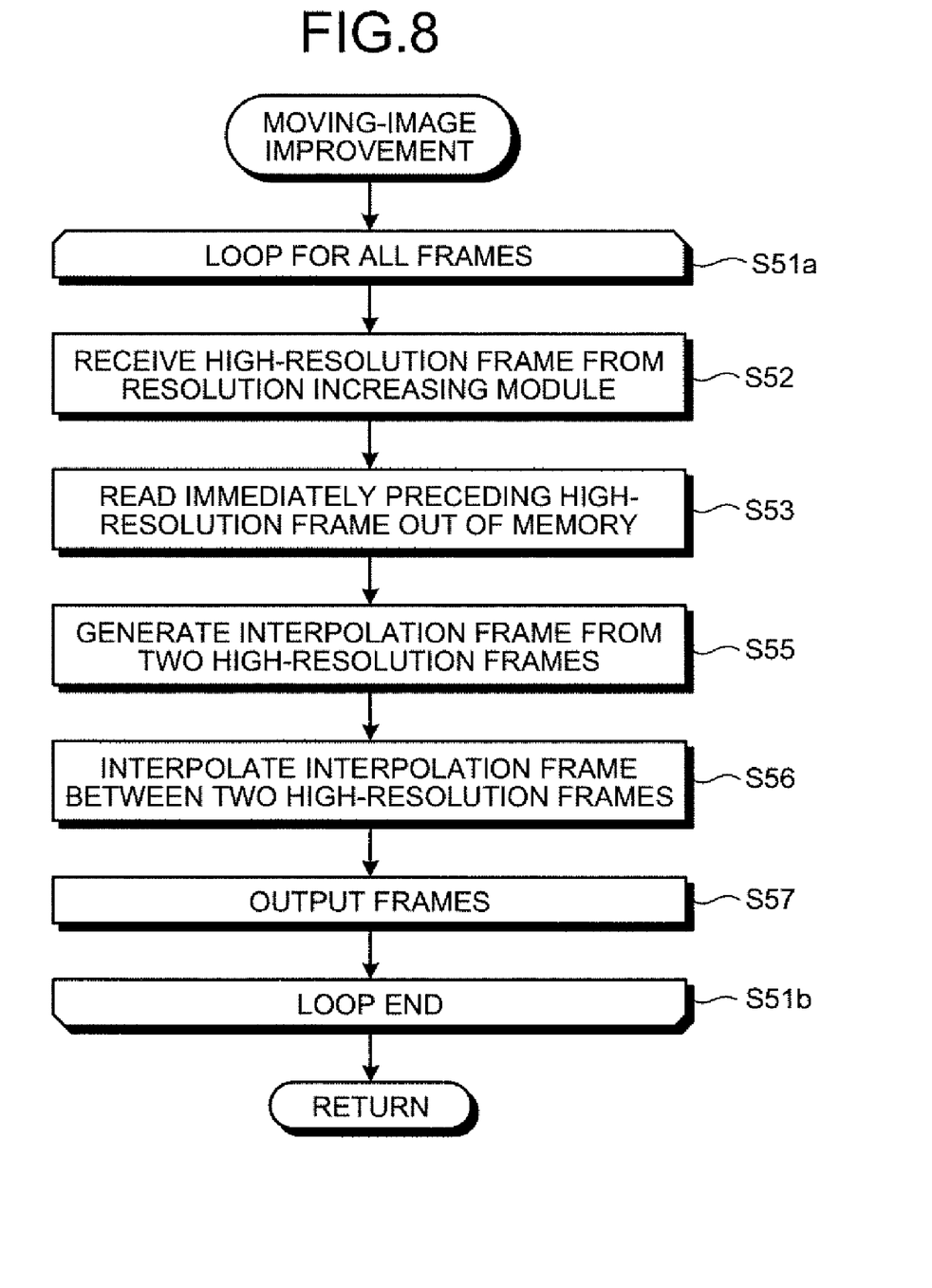
FIG. 8 is an exemplary flowchart of moving-image improvement in the embodiment.

FIG. 8 is a flowchart of the moving-image improvement performed at S13 in FIG. 6. The moving-image improving module 14 receives a high-resolution frame output from the post-processor 135 of the resolution increasing module 13 (S52), and temporarily stores it in the memory 22. Meanwhile, the moving-image improving module 14 reads an immediately preceding frame, i.e., a high-resolution frame one frame prior to the high-resolution frame received at S52, out of the memory 21 (S53), and temporarily stores it in the memory 22.

After that, the moving-image improving module 14 obtains a motion vector from the two high-resolution frames acquired and temporarily stored in the memory 22 at S52 and S53, and, based on the motion vector, generates an interpolation frame (S55). The moving-image improving module 14 interpolates the interpolation frame between the two high-resolution frames (S56). Then, the moving-image improving module 14 outputs the two high-resolution frames with the interpolation frame interpolated between them to the display processor 15 (S57). The process from S52 to S57 is performed for all frames of the moving image data output from the resolution increasing module 13 (S51a and S51b). Thus, high-resolution moving image data is generated that has a frame rate increased twice.

Referring back to FIG. 6, after the moving-image improvement, the display processor 15 receives the moving image data thus generated, and displays it on the display module 16 (S14). With this, the display module 16 displays the high-resolution moving image data in HD size with smooth motion.

As described above, according to the embodiment, the super resolution conversion is performed on low-resolution frames of moving image data to obtain high-resolution frames. After that, interpolation frames are generated and interpolated between the high-resolution frames to change the frame rate. Thus, it is possible to reduce the amount of the super resolution processing as well as to output high-quality and high-definition moving image data.

While described above as comprising the preprocessor 131 and the post-processor 135, the resolution increasing module 13 may not necessarily be provided with them. In other words, the resolution increasing module 13 may have only the super-resolution converter 133 that performs the super resolution conversion.

Besides, in the above embodiment, high-resolution frames obtained by the super resolution conversion undergo image correction before being stored in the memory 21 and output to the moving-image improving module 14. However, this is by way of example and not by way of limitation. For example, if the resolution increasing module 13 is not provided with the post-processor 135, high-resolution frames obtained by the super resolution conversion may be directly stored in the memory 21 and output to the moving-image improving module 14.

The information processing apparatus of the embodiment is described by way of example as being applied to the image display apparatus 100 such as a digital TV comprising the display processor 15, the display module 16, the audio processor 17 and the audio output module 18; however, it can be applied to, for example, a tuner or a set-top box without having those modules.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus including a processor comprising:
   a storage module configured to be capable of storing a video signal frame by frame;
   a resolution increasing module configured to perform, on receipt of a first video signal with first resolution, super resolution conversion on the first video signal to obtain a second video signal with second resolution that is higher than the first resolution by estimating an original pixel value from the first video signal and increasing pixels; and
   a moving-image improving module configured to increase a frame rate of the second video signal after the super resolution conversion,
   wherein the resolution increasing module is configured to store the second video signal obtained by the super resolution conversion frame by frame in the storage module, and
   the moving-image improving module is configured to, on receipt of a first frame of the second video signal from the resolution increasing module, read a second frame prior to the first frame from the storage module, and generate an interpolation image to be interpolated between the first frame and the second frame based on a motion vector between the first frame and the second frame to increase the frame rate of the second video signal.

2. The image processing apparatus of claim 1, wherein the resolution increasing module comprises:
   a super-resolution converter configured to perform the super resolution conversion; and
   a post-processor configured to perform image correction on frames of the second video signal after the super resolution conversion, and sequentially store the frames subjected to the image correction in the storage module.

3. The image processing apparatus of claim 2, wherein
   the resolution increasing module further comprises a preprocessor configured to perform interlace-progressive conversion and noise reduction on the first video signal, and
   the super-resolution converter is configured to receive the first video signal subjected to the interlace-progressive conversion and the noise reduction and perform the super resolution conversion on the first video signal.

4. The image processing apparatus of claim 1, wherein the second resolution is a resolution of 1920 horizontal pixels and 1080 vertical lines.

5. The image processing apparatus of claim 1, further comprising a display module configured to display moving image data.

6. An image processing method comprising:
   performing, on receipt of a first video signal with first resolution, super resolution conversion on the first video signal to obtain a second video signal with second resolution that is higher than the first resolution by estimating an original pixel value from the first video signal and increasing pixels; and
   increasing a frame rate of the second video signal after the super resolution conversion, wherein
   the performing comprises storing the second video signal obtained by the super resolution conversion frame by frame in a storage module which is configured to be capable of storing a video signal frame by frame, the increasing comprises:

receiving a first frame of the second video signal obtained by the performing, reading a second frame prior to the first frame from the storage module, and generating an interpolation image to be interpolated between the first frame and the second frame based on a motion vector between the first frame and the second frame to increase the frame rate of the second video signal.

7. A non-transitory computer-readable storage medium having tangibly stored thereon instructions, which when executed by a processor, causes the processor to perform operations comprising:

performing, on receipt of a first video signal with first resolution, super resolution conversion on the first video signal to obtain a second video signal with second resolution that is higher than the first resolution by estimating an original pixel value from the first video signal and increasing pixels, wherein the performing comprises storing the second video signal frame by frame in a storage module that is configured to be capable of storing a video signal frame by frame; and increasing a frame rate of the second video signal after the super resolution conversion, wherein the increasing comprises receiving a first frame of the second video signal obtained by the performing, reading a second frame prior to the first frame from the storage module, and generating an interpolation image to be interpolated between the first frame and the second frame based on a motion vector between the first frame and the second frame to increase the frame rate of the second video signal.

* * * * *